(12) United States Patent
Sridharan et al.

(10) Patent No.: US 11,153,701 B2
(45) Date of Patent: Oct. 19, 2021

(54) DUAL ADVANCED AUDIO DISTRIBUTION PROFILE (A2DP) SINK

(71) Applicant: Cypress Semiconductor Corporation, San Jose, CA (US)

(72) Inventors: Arvind Sridharan, San Diego, CA (US); Patrick Coupe, San Diego, CA (US); Mohan Mysore, Ramona, CA (US); James Skov, San Clemente, CA (US); Walter James Wihardja, Tustin, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/250,855

(22) Filed: Jan. 17, 2019

(65) Prior Publication Data
US 2019/0230459 A1   Jul. 25, 2019

Related U.S. Application Data

(60) Provisional application No. 62/619,578, filed on Jan. 19, 2018.

(51) Int. Cl.
*H04S 3/00* (2006.01)
*H04K 3/00* (2006.01)
*G06F 3/16* (2006.01)
*H04L 5/00* (2006.01)

(52) U.S. Cl.
CPC ............ *H04S 3/008* (2013.01); *G06F 3/16* (2013.01); *H04K 3/80* (2013.01); *H04L 5/0055* (2013.01)

(58) Field of Classification Search
CPC ............ H04S 3/008; H04S 1/005; G06F 3/16; H04K 3/80; H04L 5/0055; H04R 1/1041; H04R 1/1016; H04R 2420/07; H04R 5/00; H04R 25/00; H04R 5/033; H04B 5/00
See application file for complete search history.

(56) References Cited

U.S. PATENT DOCUMENTS

| | | | |
|---|---|---|---|
| 8,768,252 B2 | 7/2014 | Watson et al. | |
| 2010/0285750 A1 | 11/2010 | Simonelic | |
| 2012/0058727 A1* | 3/2012 | Cook | H04R 5/02 455/41.3 |
| 2015/0319557 A1* | 11/2015 | El-Hoiydi | H04R 25/556 455/41.2 |
| 2016/0148618 A1 | 5/2016 | Huang et al. | |
| 2016/0294884 A1 | 10/2016 | Vincent et al. | |
| 2017/0006415 A1* | 1/2017 | Song | H04W 4/80 |
| 2018/0084456 A1* | 3/2018 | Gostev | H04L 69/40 |

(Continued)

OTHER PUBLICATIONS

Gorius, et al. "Predictably Reliable Real-time Transport Over Large Bandwith-Delay Product Networks," 2011 NEM Summit, Sep. 29, 2011; 8 pages.

(Continued)

*Primary Examiner* — James K Mooney

(57) ABSTRACT

Wireless communication schemes and techniques are described, wherein a secondary device is configured to eavesdrop information communicated between a source and a primary device. Secondary device transmits a NACK signal to jam ACK signals from the primary device to the audio source, forcing a retransmit of audio information from the source to the primary, and available over an eavesdropping link between the secondary device and the source.

17 Claims, 14 Drawing Sheets

(56) References Cited

U.S. PATENT DOCUMENTS

2018/0084569 A1* 3/2018 Li .................... H04W 72/1263
2019/0044576 A1* 2/2019 Thoen ................. H04B 5/0031

OTHER PUBLICATIONS

International Search Report for International Application No. PCT/US19/14142 dated May 10, 2019; 4 pages.

Miroll, et al. "Efficient OFDM-based WLAN-Multicast with Feedback Aggregation and Power Control," 2011 NEM Summit, Sep. 29, 2011; 8 pages.

Written Opinion of the International Searching Authority for International Application No. PCT/US19/14142 dated May 10, 2019; 7 pages.

* cited by examiner

DUAL ADVANCED AUDIO DISTRIBUTION PROFILE (A2DP) SINK

PRIORITY

This application claims the priority and benefit of U.S. Provisional Application No. 62/619,578, filed on Jan. 19, 2018, all of which are incorporated by reference herein.

TECHNICAL FIELD

This disclosure relates to the field of wireless audio playback devices.

BACKGROUND

Wireless speakers may be configured to play back stereo sound from a signal audio source. Packets of audio information are shared with the wireless speakers through wireless links. Each wireless speaker may receive the audio information separately, or the audio information may be received by one speaker and sent to the other. In the latter case, latency between the audio source and the playback may be too great for acceptable performance from the experience of a user. It is therefore preferable to have a mechanism for both wireless devices to receive the audio information from the source simultaneously. If an audio source is in operative communication with a single wireless speaker, is may be necessary for a second speaker to receive the audio information with the knowledge of the audio source. In such cases, a mechanism for the second speaker to recover or otherwise receive lost or corrupted packets of audio information may be necessary.

DETAILED DESCRIPTION

Figure 1:
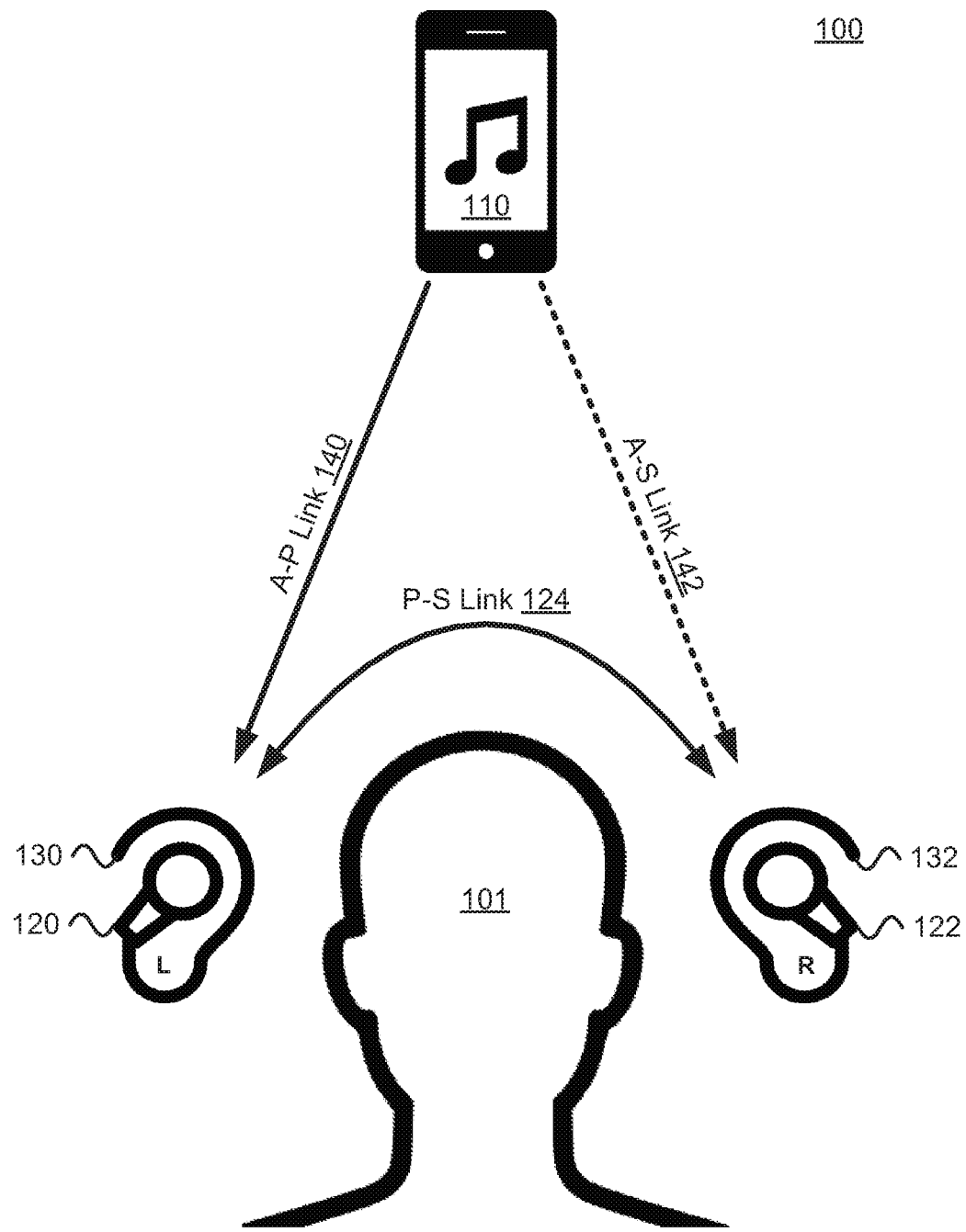
FIG. 1 illustrates an example system for wireless audio playback according to one embodiment.

The following description sets forth numerous specific details such as examples of specific systems, components, methods, and so forth, in order to provide a good understanding of various embodiments of the communication schemes and techniques. It will be apparent to one skilled in the art, however, that at least some embodiments may be practiced without these specific details. In other instances, well-known components or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

References in the description to "an embodiment", "one embodiment", "an example embodiment", "some embodiments", and "various embodiments" mean that the particular feature, structure, or characteristic being referred to is included in at least one embodiment of the invention. Further, the appearances of the phrases "an embodiment", "one embodiment", "an example embodiment", "some embodiments", and "various embodiments" in various places in the description do not necessarily all refer to the same embodiment(s).

In various embodiments, the communication schemes and techniques described herein may comprise one or more methods that are executed by one or more devices and/or controllers thereof. Although the operations of such method(s) are shown and described hereinafter in a particular order, the operations of each method may be altered so that certain operations may be performed in a different order or so that certain operation(s) may be performed, at least in part, concurrently and/or in parallel with other operations. In other embodiments, instructions or sub-operations of distinct operations may be executed in an intermittent and/or alternating manner. Thus, the various method embodiments of the described techniques, as well as the order of operations therein, are to be regarded in an illustrative rather than a restrictive sense.

In an example embodiment of the communication schemes and techniques described herein, a device comprises a primary audio playback device in operative communication with an audio source over a wireless medium (frequency band) and a secondary audio playback device configured to eavesdrop audio information transmitted from the audio device to the primary audio playback device over the medium. The secondary audio device may be configured to transmit a NACK signal on the medium, the NACK signal for jamming an ACK signal that may be transmitted by the primary device. The primary device and the secondary device may also be in operative communication with each other over the medium and this communication may be synchronized with a signal or a clock from the audio source to ensure reliable communication over the various links (i.e., avoiding collisions). The primary and the secondary device may be configured as slaves to the audio source, and the secondary device may be configured as a slave to the primary device. The primary and secondary devices may be configured to share audio information that is not received by each to complete audio information. The sharing of this audio information may be over a link between the primary and the secondary and may occur during periodic sniff operations. Sniff operations may be synchronous or asynchronous. Missing packets may be identifying by sharing packet sequences received by the primary and the secondary over the medium through the sniff operations. The roles of the primary device and the secondary device may also be switched or otherwise changed during development, manufacturing, on start-up, or during run-time based on system parameters, such as battery life and signal strength.

In an example embodiment of the communication schemes and techniques described herein, a method comprises: receiving, by a primary device, data on an audio source-primary device (A-P) link; pausing data exchange on the A-P link; gathering protocol and timing information for the A-P link; sending, by the primary device, the protocol and timing information for the A-P link to a secondary device; applying, by the secondary device, the protocol and timing information for the A-P link to the secondary device; and resuming data exchange on the A-P link. The method may further include establishing a link between the audio source and the secondary device (an A-S link) and receiving information for playback from the audio source over the A-S link. In another embodiment, the secondary may send a NACK signal to jam an ACK signal from the primary to the audio source. With the ACK signal having been jammed, the audio source may retransmit audio information over a medium so that it can be received by the primary device and the secondary device.

In an example embodiment of the communication schemes and techniques described herein, a wireless audio playback device may include an audio transducer (e.g., a speaker) for playing audio information sent from an audio source. An antenna may be configured to receive the audio information over a medium from the audio source. The wireless audio playback device may be configured to transmit a NACK signal on the medium if a packet is corrupted or otherwise unavailable to the wireless audio playback device. The NACK signal may be such that it jams an ACK signal from a second wireless audio playback device, causing the audio source to retransmit the audio information to the wireless audio playback devices (both the first and the second wireless audio playback devices. Audio information to the first wireless audio playback device may be received over an eavesdropping link between the first wireless audio playback device and the audio source. In one embodiment, the eavesdropping link may be transparent to the audio source.

FIG. 1 illustrates a system 100 for wireless audio playback including wireless devices configured with Wireless Audio Stereo Sync (WASS™). System 100 includes an audio source 110 which is configured to provide audio information (i.e. "packets") to wireless devices 120 and 122. Wireless devices 120 and 122 may include a primary wireless device ("primary") 120 and a secondary wireless device ("secondary") 122. Primary 120 may be a left earbud corresponding to the left ear 130 of user 101 and secondary 122 may be a right earbud corresponding to the right ear 132 of user 101. The assignment of the primary 120 and secondary 122 to corresponding ears of user 101 may be arbitrary, it may be based on system parameters, it may be defined during production, or it may be defined at device start-up or during run-time. The assignment of primary 120 and secondary 122 to a left ear or a right ear may be changed during operation in response to signals from the audio source, measurement of battery levels the primary and secondary devices, signal strength, or other system parameters.

A link between audio source 110 and primary 120 (A-P link 140) may be formed and known to audio source 110. A link between audio source 110 and secondary 122 (A-S link 142) may be formed and unknown to audio source 110. A-S link 142 may be used by secondary 122 to "eavesdrop" on signals (and packets) transmitted on A-P link 140 without knowledge or control by audio source 110. A link between primary 120 and secondary 122 (P-S link 124) may be formed to share timing and other information about communication from audio source 110 with secondary 122 to enable eavesdropping via A-S link 142. A-P link 140, A-S link 142, and P-S link 124 may all share a medium. In other words, they may share a wireless frequency band. P-S link may also be used to share missing or lost audio information (packets) between primary 120 and secondary 122, as well as share information regarding communication with audio source 110.

Figure 2:
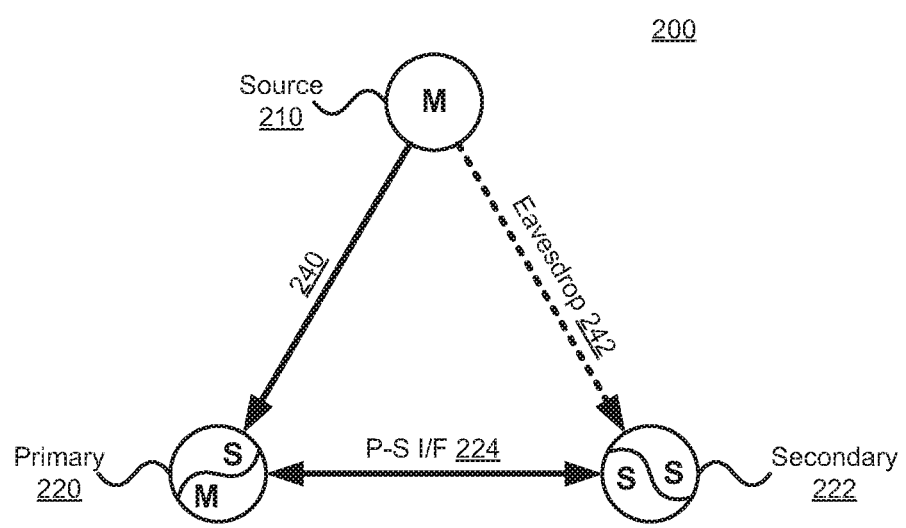
FIG. 2 is an example scatternet for wireless audio playback according to one embodiment.

FIG. 2 illustrates a scatternet 200 for wireless audio playback similar to system 100 of FIG. 1. Scatternet 200 includes source 210, which may be configured as a master device ("M"). Scatternet 200 also includes a primary device 220 capable of wireless communication with source 210 over link 240. Link 240 may be used for synchronous audio with a hands-free profile (HFP) or asynchronous audio with an advanced audio distribution profile (A2DP). HFP may be used for communication of voice signals. A2DP may be used for music streaming or other, similar audio outputs. Primary device 220 may operate as a slave device ("S") to source 210. Scatternet 200 also includes a secondary device 222 capable of receiving audio information from audio source 210 via an eavesdropping link 242. Secondary device 222 may operate as a slave to source 210. A third interface (I/F) 224 may be formed between primary device 220 and secondary device 222, wherein primary device 220 operates as the master and secondary device operates as the slave. P-S I/F 224 may be used for communicating connection and timing information to secondary device 222 or for sharing audio information (i.e., packets) between primary device 220 and secondary device 222 to ensure quality playback for a user (such as user 101 of FIG. 1).

Figure 3A:
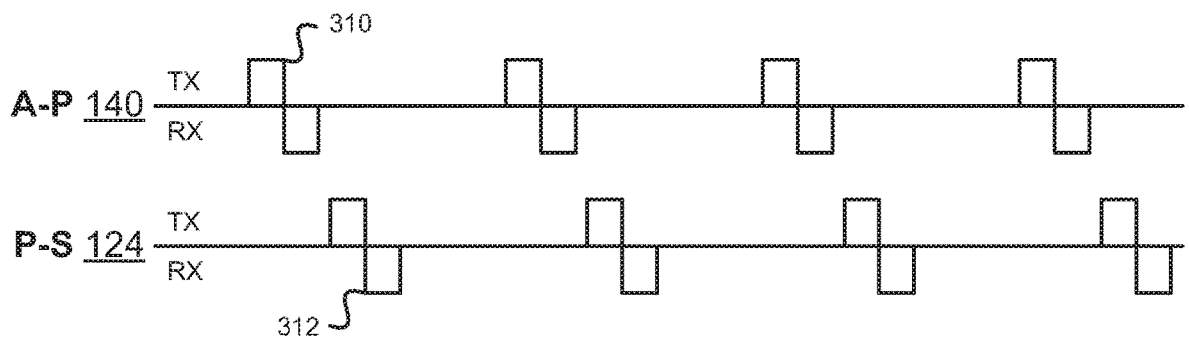
FIGS. 3A-C is a are timing diagrams for communication between an audio source and a primary device and between a primary device and a secondary device, wherein the timing of communication between the primary device and the secondary device follows the timing of the communication between the audio source and the primary device.
Figure 3B:
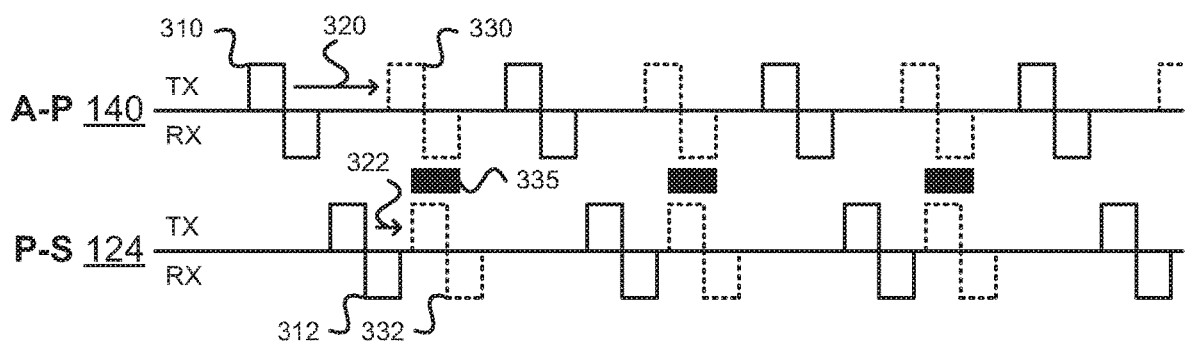
Figure 3C:
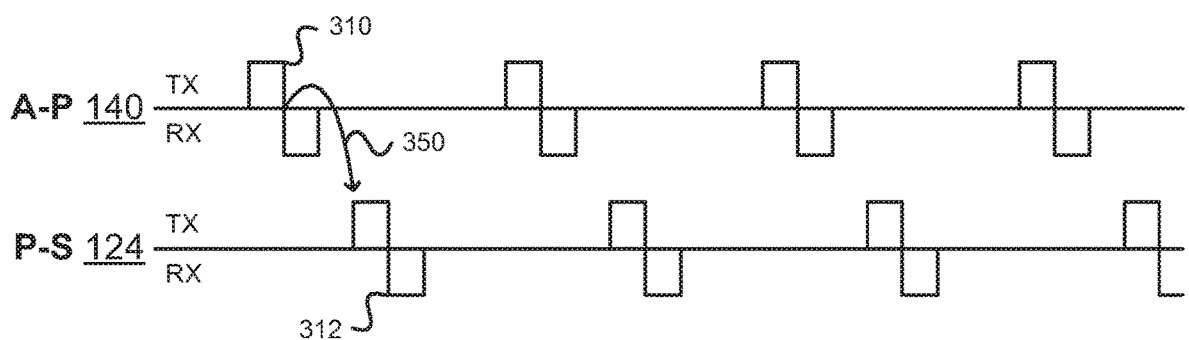

FIGS. 3A-3C illustrate timing of communication over A-P link 140 and P-S link 124. In FIG. 3A clock 310 for A-P link 140 and clock 312 for P-S link 124 are aligned such that there are no collisions and the transmit/receive (TX/RX) operations on each of the links are not impacted by TX/RX operations on the other.

FIG. 3B shows that A-P link 140 may have a different clock drift 320 than P-S link 124 (drift 322). Over time, the differences in drift 320 and drift 322 may cause clock 310 to correspond to clock 330 and clock 312 to correspond to clock 332. Clocks 330 and 332 have a collision 335, which may impair the performance over each link as signals interfere with each other.

One solution is shown in FIG. 3C, wherein clock 312 of P-S link 124 follows clock 310 of A-P link 140 by a certain interval 350. By tying clock 312 to clock 310, and following clock 310, there are no collisions between clock 310 and clock 312. Clock following may be established by using the Bluetooth clock of the audio source as a master or reference clock and adjusting the clock for communication between the primary and secondary (for P-S link 124) to match (and follow) the clock of the audio source. In this embodiment, the audio source may send clock information on every TX. The primary and secondary may then use the difference between their clocks and the master clock that is received over the A-P and A-S links to calculate a change for their clocks. This maintains alignment and prevents collisions. In this way, the audio source may control the timing of P-S link 124.

Aligning the clocks over A-P link 140 and P-S link 124 may also align the clock of A-S link 142, allowing better aligning in audio playback. Additionally, synchronization of music or voice through the synchronization of the clocks allows for synchronized injected audio. In one embodiment, either the primary or the secondary device may determine that audio is to be played over the respective speakers that is not sent from the audio source. Examples of such audio that is played over the respective speakers include remaining battery life, volume level, link status with the audio source, or other information that is relevant to the primary and secondary device, but is not broadcast from the audio source. By synchronizing the clocks of the primary device and the secondary device to the Bluetooth clock of the audio source, the primary and secondary devices may arbitrate what needs to be played and when. For example, primary and secondary devices may determine that an audio clip is to be played 75 ms in the future. That both devices have synchronized clocks makes this possible and provides the user with information that is overlayed on top of or replaces the audio information from the audio source.

Figure 4:
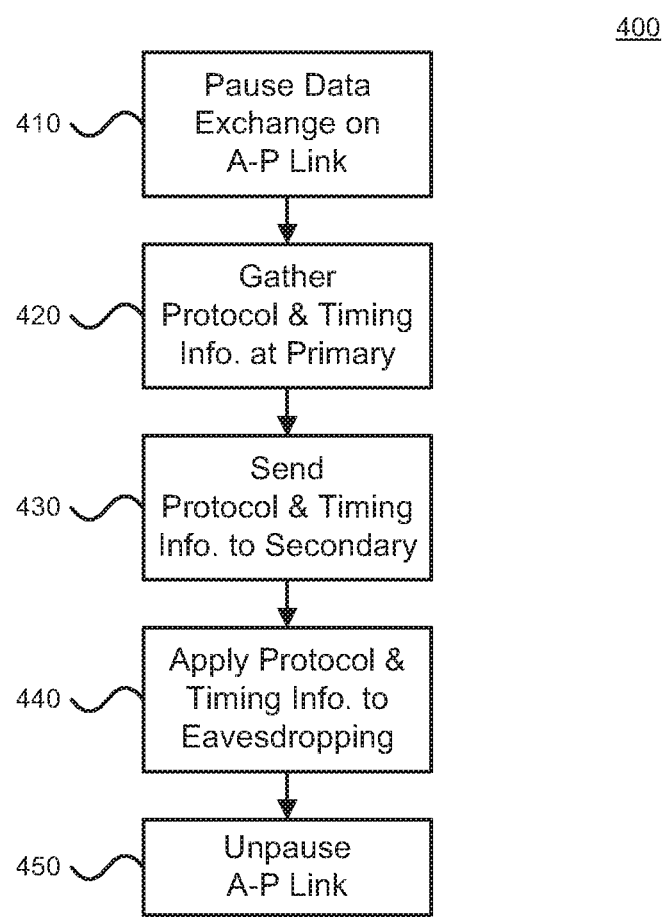
FIG. 4 is a flow diagram illustrating an example method for establishing eavesdropping in a wireless audio system according to some example embodiments.

FIG. 4 illustrates a method 400 for establishing eavesdropping by the secondary device over A-S link 142 of FIG. 1 or eavesdropping link 242 of FIG. 2. A link may be established between a primary device and an audio source (A-P link) by which data (audio data or packets) may be exchanged. The A-P link may be established according to known methods, include those described in the Bluetooth (BT) specification. When establishing eavesdropping by a secondary device, data exchange on the A-P link may be paused in step 410. Protocol and timing information may then be gathered by the primary device in step 420 and sent to the secondary device in step 430. The secondary device may apply the protocol and timing formation provided by the primary device in step 440 so that it is able to receive audio information over the A-S link (or eavesdropping link) in step 440. Primary device may then unpause the A-P link in step 450. After the A-P link is unpaused, audio information may be shared between the audio source and the primary device and additionally received by the secondary device through the A-S link (or the eavesdropping link).

Figure 5:
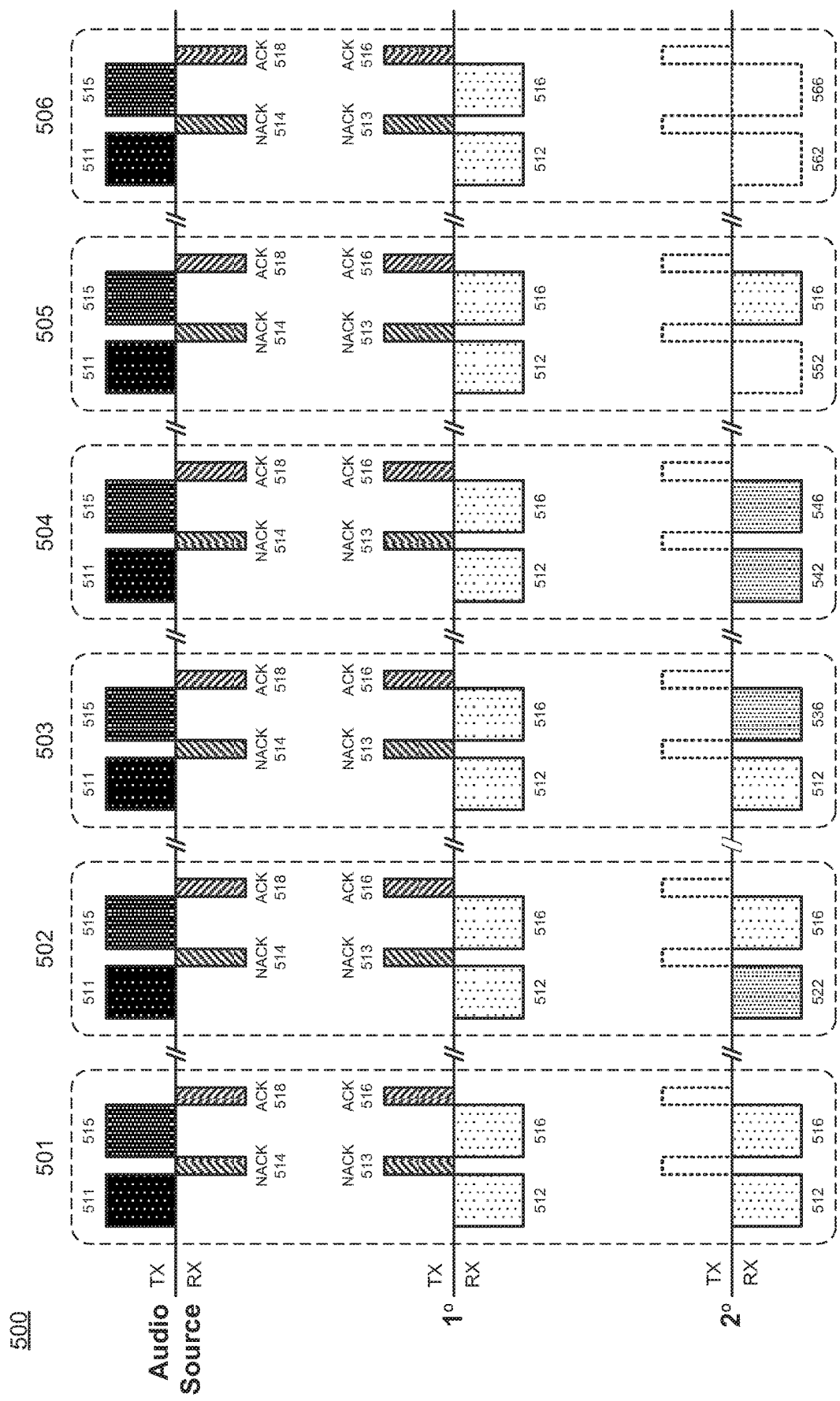
FIG. 5 is a communication scheme wherein a first packet is NACK'd by a primary device, according to various embodiments.

FIG. 5 illustrates various embodiments of packet transmission, receipt, and acknowledgment wherein the first packet transmitted by the source is always NACK'd by the primary, causing the source to retransmit the packet. On each packet from the audio source, a NACK by the primary may cause a second transmission. This provides the primary and the secondary with two opportunities to receive the same information (packet). In some instances, this may occur anyway, for instance if the primary did not receive the packet on the first transmission. But in other instances, the second transmission of packet may be duplicative for either the primary or the secondary or both. In still other instances, the second transmission of the packet may not be received by the primary or the secondary, but as long as the first transmission of the packet is received, the information is provided to both the primary and the secondary and audio playback is provided.

In transmission 501, packet 511 is transmitted by the source and received as packet 512 by both the primary and the secondary. As the primary is the only device in operative communication with the source, NACK 513 is transmitted only by the primary and received at the source as NACK 514. As packet 511 has been NACK'd, a second packet 515 is sent that is identical to packet 511. Packet 515 is received as packet 516 by both the primary and the secondary. The primary transmits ACK 517 which is received by the source as ACK 518. In the embodiment of transmission 501, information is sent by the source twice as packets 511 and 515, but the retransmission of packet 511 as packet 515 is superfluous as packet 511 was received by the secondary.

In transmission 502, packet 511 is transmitted by the source and received by the primary as packet 512. The secondary does not receive the information as packet 512. Rather, the packet is not received or is otherwise corrupted as packet 522. As the secondary is not in operative communication with the source, there is not a mechanism for the secondary to request that the source resend packet 511. However, since NACK 513 is provided by primary and received as NACK 514, packet 515 is transmitted and received by the secondary as packet 516. The information is therefore provided to both the primary and the secondary; the second transmission, caused by NACK 513 is necessary.

In transmission 503, packet 511 is transmitted by the source and received by the primary as packet 512. The secondary does receive the information as packet 512, but as with transmissions 501 and 502, the primary transmits NACK 513 with is received as NACK 514. Packet 515 is then send and received by the primary as packet 516, but is not received or is otherwise corrupted as packet 536. That the retransmitted packet 515 is not received by the secondary is inconsequential as the original packet 511 was received by the secondary as packet 512. As with transmission 501, the NACK by the primary is not necessary as the original packet was received by both the primary and the secondary.

In transmission 504, packet 511 is transmitted by the source and received by the primary as packet 512. The secondary does not receive the information as packet 512, similar to transmission 502. The primary automatically sends NACK 513 which is received as NACK 514 and primary sends packet 515, just as in transmission 501-503, above. But in transmission 504, both packets 511 and 515 are not received or are otherwise corrupted as packets 542 and 546, respectively. As the secondary has no mechanism to communicate the failure to the source, the information in packets 511 and 515 is not received by the secondary from the source. If the information is to be received or otherwise recovered, a different mechanism must be used.

In transmission 505, as in transmission 502, packet 511 is transmitted by the source and received by the primary as packet 512. The secondary does not receive the information as packet 512. Rather, the packet is not received or is otherwise corrupted as missing packet 552. As the secondary is not in operative communication with the source, there is not a mechanism for the secondary to request that the source resend packet 511. However, since NACK 513 is provided by primary and received as NACK 514, packet 515 is transmitted and received by the secondary as packet 516. The information is therefore provided to both the primary and the secondary; the second transmission, caused by NACK 513 is necessary.

In transmission 506, as in transmission 504, packet 511 is transmitted by the source and received by the primary as packet 512. The secondary does not receive the information as packet 512. The primary automatically sends NACK 513 which is received as NACK 514 and primary sends packet 515, just as in transmission 501-505, above. But in transmission 506, both packets 511 and 515 are not received by the secondary. As the secondary has no mechanism to communicate the failure to the source, the information in packets 511 and 515 is not received by the secondary from the source. If the information is to be received or otherwise recovered, a different mechanism must be used.

Figure 6:
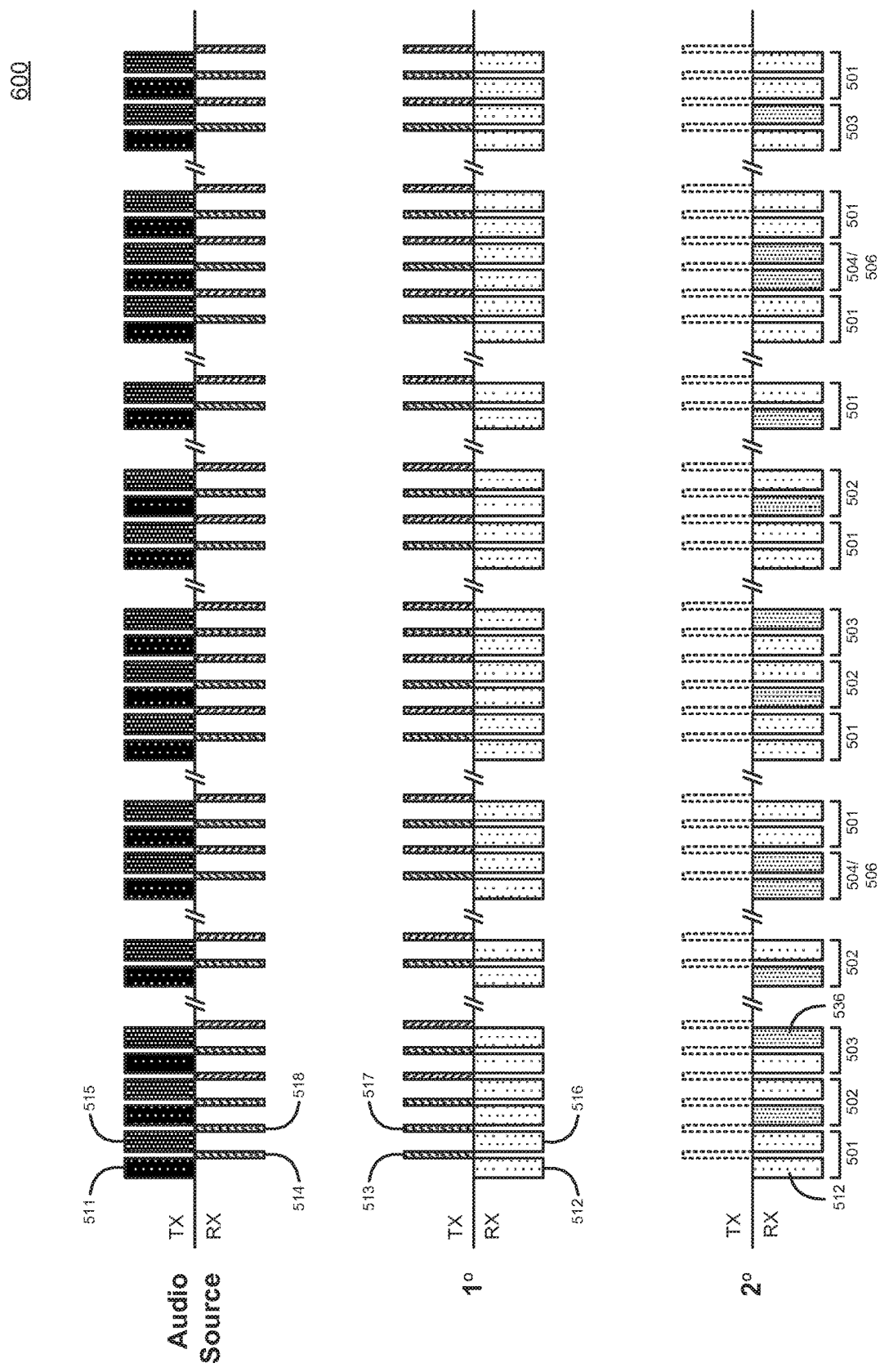
FIG. 6 is a sample communication between an audio source and a primary and a secondary, including missing or corrupted packets, according to various embodiments.

FIG. 6 illustrates a series 600 of packets communicated by the audio source with the first packet NACK'd as illustrated in and described with regards to FIG. 5. Packets received, or not received, by the secondary are illustrated and referenced according to the various transmissions 501-506 of FIG. 5. Transmissions from which both packets 511 and 515 are missing or are otherwise corrupted at the secondary are illustrated as transmissions 504/506. This occurs twice in series 600.

Figure 7:
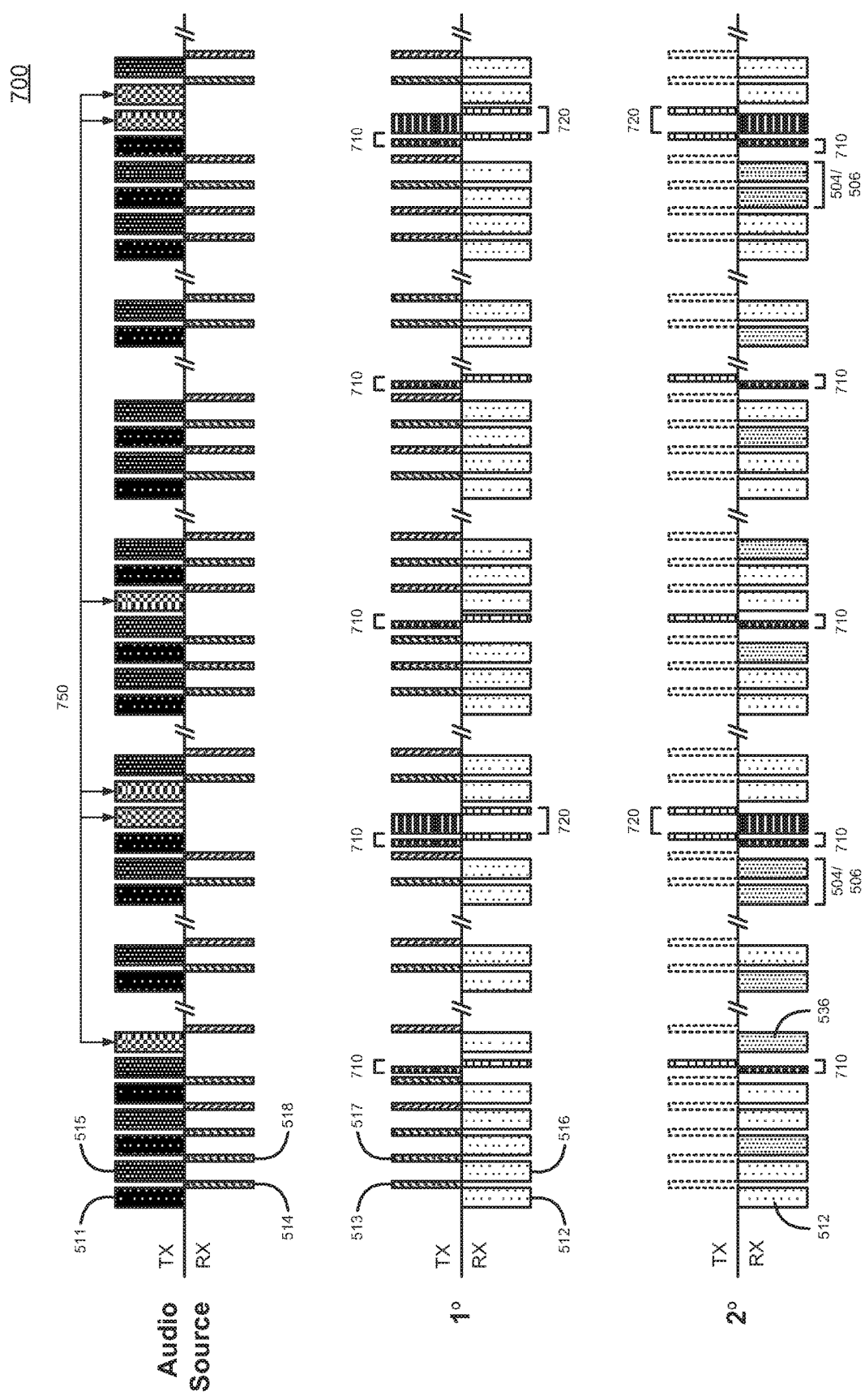
FIG. 7 is a sample communication between an audio source and a primary and a secondary, including missing or corrupted packets and a sniffing operation, according to various embodiments.

FIG. 7 illustrates a series 700 of packets similar to series 600 of FIG. 6. Packets are communicated by the audio source with the first packet NACK'd, as illustrated in and described with regards to FIGS. 5 and 6. However, the primary and the secondary may periodically sniff the medium. The periodic sniff of the medium by the primary and the secondary allows the primary and the secondary to ensure that the packets received by each are a complete list of the packets transmitted by the audio source. Sniff 710 may occur at some interval. The primary may transmit the packets it has received from the audio source. The secondary may receive the information and transmit the packets that it has received from the audio source. If a packet is missing from the list provided by the secondary, the primary may transmit that packet to the secondary on a subsequent sniff interval or immediately following in a transmit operation 720.

A sniff 710 or a transmit operation 720 from the primary to the secondary may cause a collision with the packets from the audio source. In his instance, no ACK or NACK is sent from the primary and received by the audio source. Consequently, a replacement packet 750 is provided. Replacement packet may be received just as packets 512 and 516 of FIG. 5.

The embodiment of FIG. 7 illustrates that the missing packet on the secondary may be provided by the primary. However, in another embodiment, sniff 710 may identify that a packet was received by the secondary and not by the primary. In this embodiment, the secondary may transmit the missing or otherwise corrupted packet to the primary.

During a sniff operation, the primary and secondary may share the sequence numbers of received packets first without sharing the actual packet information. They may save time and power as less information is shared over the P-S link. If there is a difference in the packet sequence numbers for the primary and the secondary, a subsequent sniff operation may be used to share the missing packets between the primary and the secondary. In one embodiment, a regular sniff operation may be used. In this embodiment, the data shared between the primary and the secondary during a regularly scheduled sniff may include the packet information that was identified as missing or otherwise corrupted in in the previous sniff interval. In another embodiment, data transmission between the primary and the secondary to correct for lost or corrupted packets may occur immediately after the sharing of the sequence numbers, or at some time not aligned with a regular sniff operation. Table 1 illustrates various embodiments of shared data based on sequence data exchanged between the primary and the secondary over the P-S link.

TABLE 1

| Sniff | Sequence 1° | Sequence 2° | Action |
| --- | --- | --- | --- |
| 1 | 1 | 1 | None. |
|  | 2 | 2 |  |
|  | 3 | 3 |  |
|  | 4 | 4 |  |
| 2 | 5 | 5 | 1° shared [6] with 2° |
|  | 6 | 7 |  |
|  | 7 | 8 |  |
|  | 8 |  |  |
| 3 | 9 | 9 | 2° shares [11] with 1° |
|  | 10 | 10 |  |
|  | 12 | 11 |  |
|  |  | 12 |  |
| 4 | 13 | 14 | 1° shares [13] with 2° |
|  | 14 | 15 | 2° shares [15] with 1° |
|  | 16 | 16 |  |

For Sniff 1, both the primary and the secondary have the same packets in the exchanged sequence numbers. In this instance, there is no audio information (packets) that needs to be shared between the primary and the secondary to correct for missed or corrupted packets. For sniff 2, the primary has a packet sequence of 5-6-7-8, while the secondary has a packet sequence of 5-7-8. This means that the secondary did not receive packet [6]. The primary can share this packet with the secondary on a subsequent sniff operation, or asynchronously through an out-of-phase transmission over the P-S link. For sniff 3, the primary has a sequence of 9-10-12 and the secondary has a sequence of 9-10-11-12. This means that the primary did not receive packet [11]. The secondary can share this packet with the primary on a subsequent sniff operation, or asynchronously through an out-of-phase transmission over the P-S link. For sniff 4, the primary has a sequence of 13-14-16 and the secondary has a sequence of 14-15-16. This means that the primary did not receive packet [15] and the secondary did not receive packet [13]. The primary and the secondary can share the missing packets with each other in a subsequent sniff operation, or asynchronously through an out-of-phase transmission over the P-S link.

Table 1 shows a simplified exchange between the primary and the secondary. But longer (or shorter) sequences may be shared. In some instances quite a few packets may be lost or otherwise corrupted. In these instances, it may be necessary to employ packet loss concealment schemes. These packet loss concealment schemes may be based on the packets received at the primary and the secondary in isolation or they may use the combined packet information. For example, if both the primary and the secondary are missing the same packet, it may be necessary to request the lost packet again from the audio source. In another embodiment, the primary and/or the secondary may employ a packet loss concealment scheme to repair the audio information.

In still another embodiment, if there may be too many lost or corrupted packets to conceal or share between the primary and the secondary. In this case, either the primary or the secondary or both may play (or otherwise broadcast) silence to maintain synchronization of the audio information.

Figure 8:
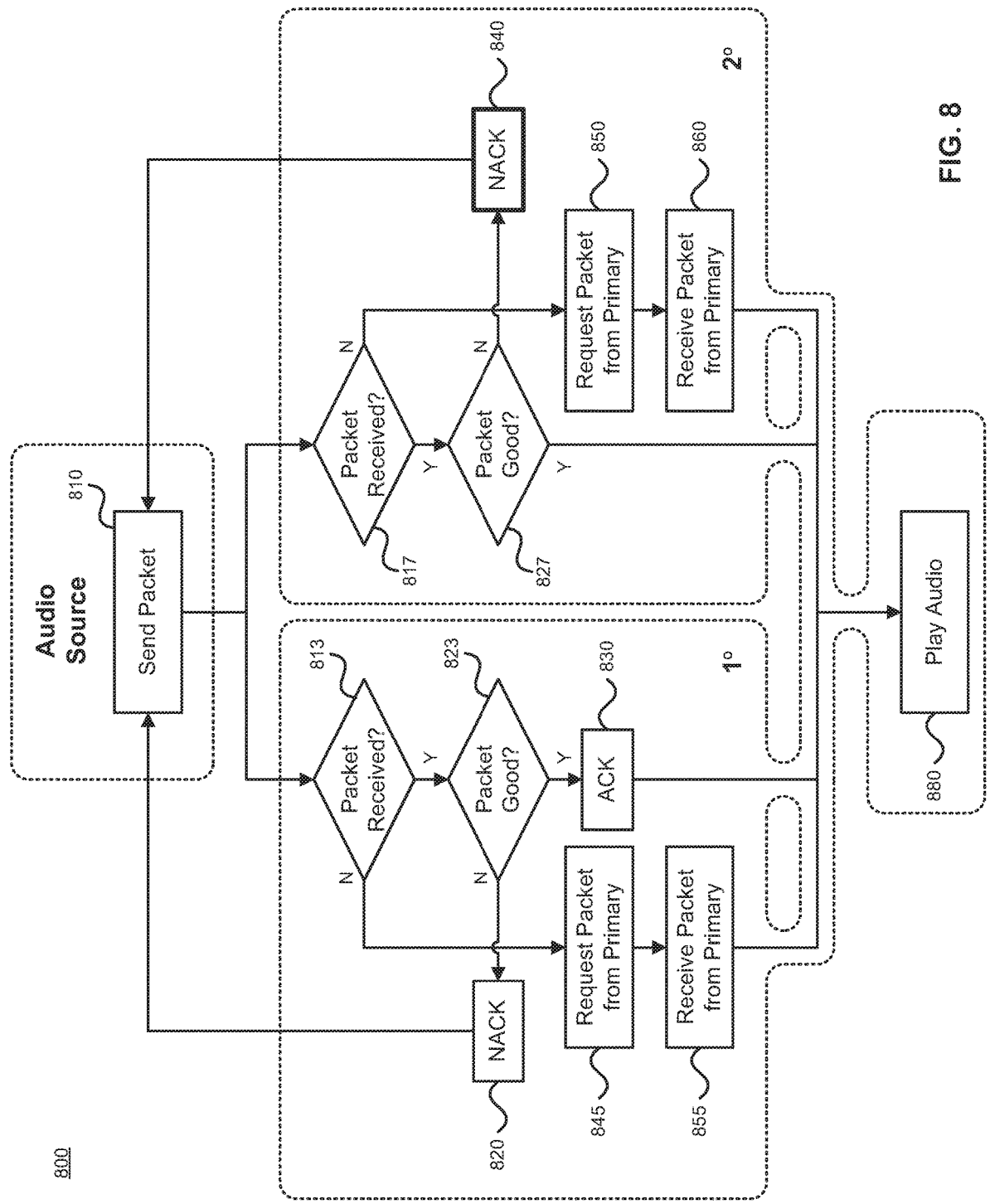
FIG. 8 is a flow diagram for ACK jamming by a secondary device, according to one embodiment.

FIG. 8 illustrates a method 800 for ACK jamming (or "ACK clobbering") by the secondary when a packet is errored or otherwise corrupted. In this embodiment, the secondary interferes with the ACK by the primary so that it is not received by the audio source. As the ACK is not received by the audio source, the packet is retransmitted. First, the packet is transmitted by the audio source in step 810. The packet is transmitted only to the primary, but the secondary is configured to eavesdrop the signal according to FIG. 4 and therefore receives packets intended for the primary. If the packet is not received by the primary in step 813, the packet may be requested from the secondary through a sniff operation in step 845 and received from the secondary in step 855. Once the primary has the information from the audio source and the secondary, the audio information may be played in step 880. If the packet is received in step 813, but is determined to be corrupted in step 823, a NACK is sent in step 820 to the audio source to request transmission. If the packet is received and is not corrupted, an ACK is sent to the audio source in step 830. Simultaneous to the decisions made by the primary, if the secondary does not receive the packet in step 817, the packet is requested from the primary in step 850 and received from the primary in step 860. This may occur synchronously (through a sniff operation) or asynchronously. Once the packet has been received by the secondary, audio information may be played in step 880. If the packet is received in step 817 and is not corrupted in step 827, the audio information contained therein may similarly be played in step 880 by each of the primary and the secondary. If the packet is received in step 817, but is corrupted in step 827, a NACK may be transmitted in step 840. The purpose of the NACK from step 840 is to jam or "clobber" the ACK from the primary in step 830, thereby prompting the audio source to retransmit the packet in step 810.

In some embodiments the NACK from the secondary that is used to jam the ACK from the primary may be transmitted slightly earlier than the ACK from the primary and/or at a higher power than the ACK from the primary. In some embodiment, the NACK from the secondary may be transmitted 2-3 μs before the ACK from the primary.

Figure 9:
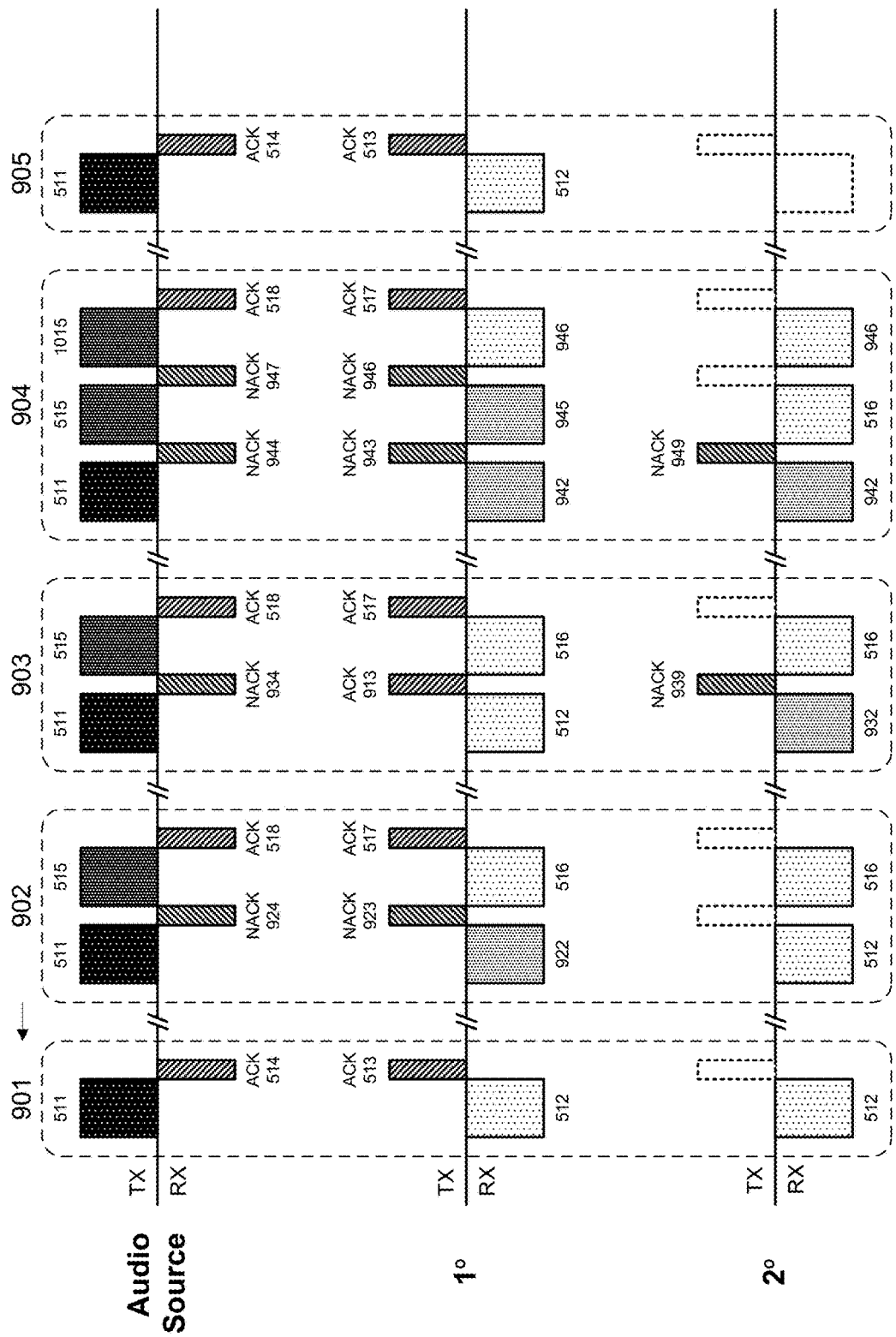
FIG. 9 is a communication scheme including ACK jamming by a secondary device, according to various embodiments.

FIG. 9 illustrates various embodiments of transmissions of audio information from an audio source to a primary and eavesdropped by a secondary. In transmission 901, packet 511 is transmitted by the audio source and received as packet 512 by the primary and the secondary. The primary sends ACK 513 that is received by the audio source as ACK 514.

In transmission 902, packet 511 is not received or is otherwise corrupted as packet 922. The primary responds with NACK 923 which is received as NACK 924 by the audio source. The secondary receives the information as packet 512, but does not provide an ACK as it is not in operative communication with the audio source. After receipt of NACK 924, audio source then retransmits the audio information as packet 515, which is received by both the primary and the secondary as packet 516. The secondary already has the audio information, but the primary does not. The primary responds with ACK 517, which is received as ACK 518 by the audio source.

In transmission 903, packet 511 is not received or is otherwise corrupted by the secondary as packet 932. Packet 511 is received by the primary as packet 512. The primary attempts to respond with ACK 913, but secondary jams ACK 913 with NACK 939, which may be transmitted slightly before and/or at a higher power than ACK 913. NACK 939 is therefore received by the audio source as NACK 934. Audio source then resends the audio information as packet 515, which is received by both the primary and the secondary as packet 516. The primary responds with ACK 517, which is not jammed by a NACK from the secondary as the packet is received and is good by the secondary.

In transmission 904, packet 511 is not received or is otherwise corrupted by the primary and the secondary as packet 942. The primary responds with NACK 943 and the secondary responds with NACK 949, which are received as NACK 944 by the audio source. The audio source then sends packet 515, which is received as packet 516 by the secondary, but is not received or is otherwise corrupted by the primary as packet 945. The primary responds with NACK 946, causing the secondary to resend the packet for a second time as packet 915, which is received by both the primary and the secondary as packet 946. The secondary already has the audio information as packet 516. The primary responds with ACK 517 which is received by the audio source as ACK 518.

In transmission 905, packet 511 is not received at all by the secondary. The secondary may not have enough information to respond with a NACK to jam the ACK of the primary. In this case, the secondary may request the information from the primary as described above with regard to sniffing in FIG. 7. In other embodiments other methods of error correction or packet loss concealment may be employed.

Figure 10:
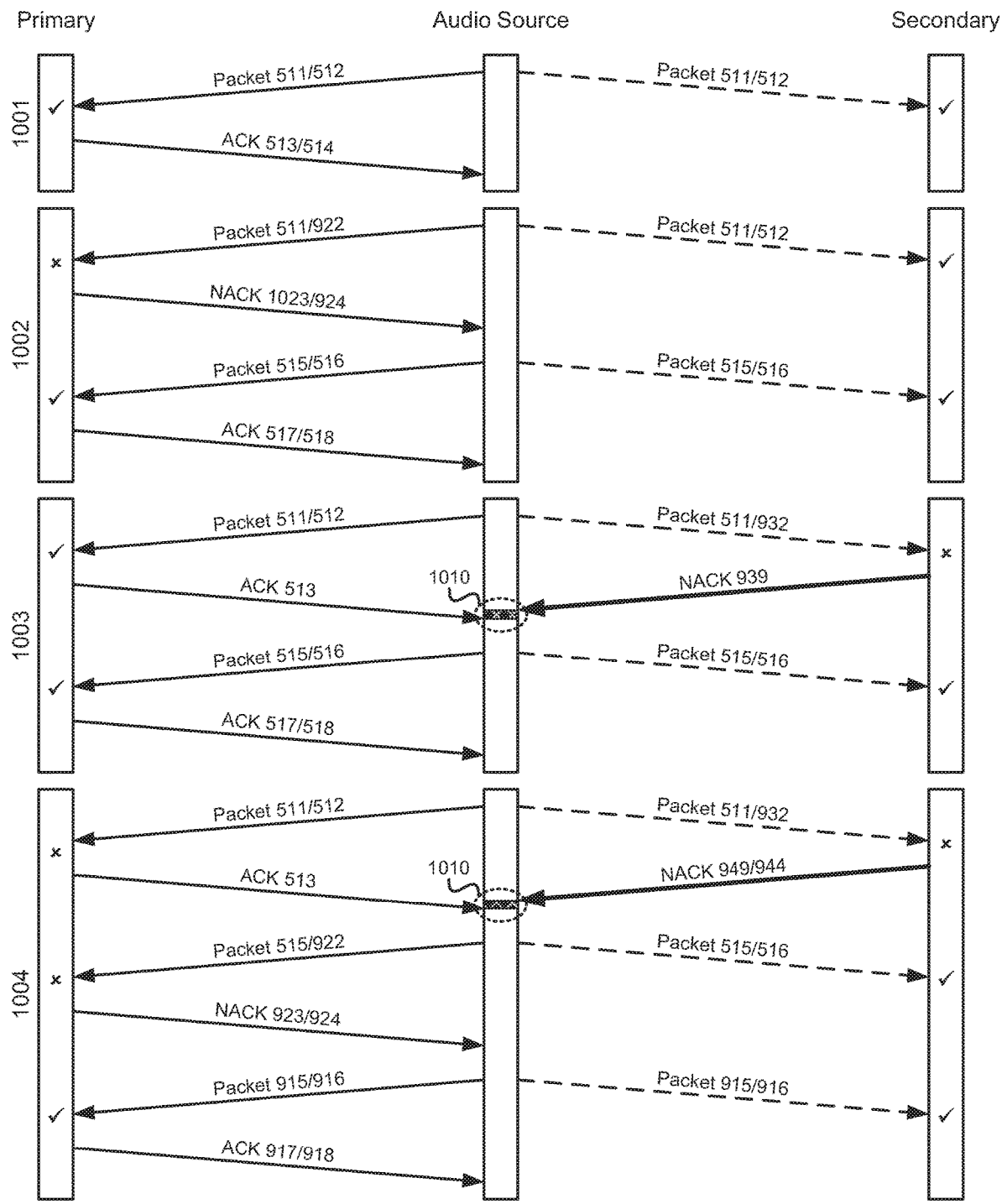
FIG. 10 is a communication scheme including ACK jamming by a secondary device, according to various embodiments.

FIG. 10 illustrates various transmissions between an audio source and a primary and a secondary. In transmission 1001, which may correspond to transmission 901 of FIG. 9, packet 511 is sent from the audio source and received by the primary and the secondary as packet 512. The primary may respond with ACK 513 which is received as ACK 514.

In transmission 1002, which may correspond to transmission 902 of FIG. 9, packet 511 is sent from the audio source and received by the secondary as packet 512. Packet 511 may not be received or may be otherwise corrupted at the primary as packet 922. The primary may then respond with NACK 923 which is received as NACK 924 by the audio source. The audio source may resend the audio information as packet 515, which is received by the primary and secondary as packet 516. The primary may respond with ACK 517, which is received by the audio source as ACK 518.

In transmission 1003, which may correspond to transmission 903 of FIG. 9, packet 511 is send from the audio source and received by the primary as packet 512. The packet may not be received by the secondary. The primary may respond to receiving packet 512 with ACK 513. But the secondary may jam ACK 513 from the primary with NACK 939, which may be sent earlier than and at a higher power than ACK 513. The amount of time 1010 by which NACK 939 is transmitted earlier than ACK 515 may be 2-3 μs. Audio source may respond to NACK 939 by resending the audio information as packet 515, which may be received by both the primary and the secondary as packet 516. The primary may respond with ACK 517, which is received by the audio source as ACK 518. As the secondary successfully received packet 515, no NACK is used to jam ACK 517.

In transmission 1004, which may correspond to transmission 904 of FIG. 9, packet 511 is sent from the audio source and received by the primary as packet 512. However, packet 511 is not received or is otherwise corrupted at the secondary as packet 942. As the primary attempts to respond with ACK 513, the secondary jams ACK 513 with NACK 939, which is received as NACK 940 by the audio source. The audio source then sends the audio information as packet 515, which is received as packet 516 by the secondary, but is not received or is otherwise corrupted by the primary as packet 922. The primary responds to the second attempt to send the audio information with NACK 923, which is received by the audio course as NACK 924. Audio source attempts a third transmission of the audio information as packet 1015, which is received by the primary and secondary as packet 1016. Primary confirms receive of packet 1016 with ACK 1017, which is received by the audio source as ACK 1018.

Figure 11:
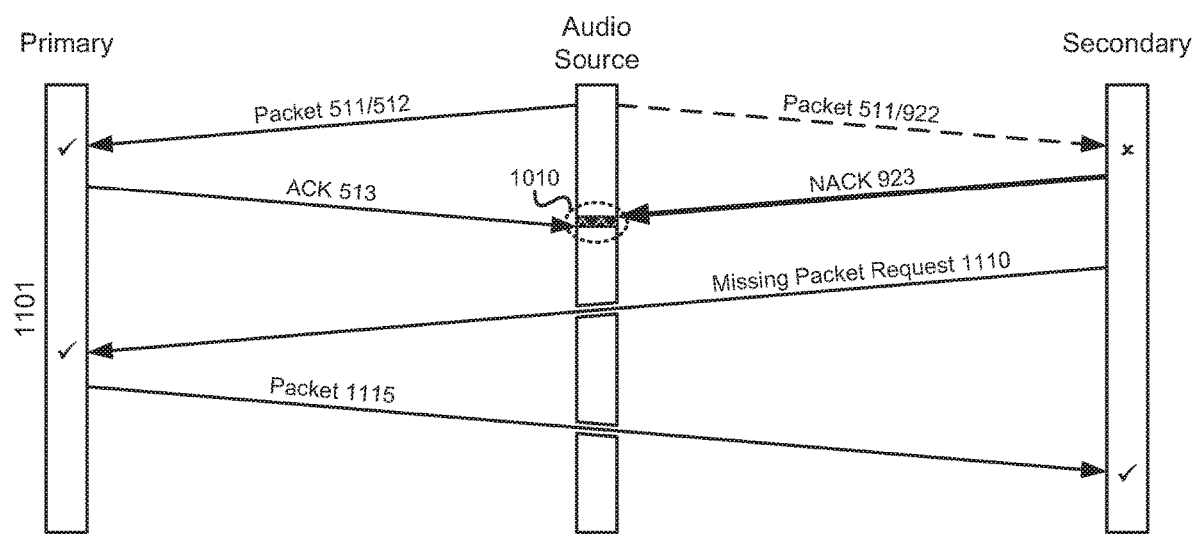
FIG. 11 is a communication scheme including ACK jamming by a secondary device and missing packets communicated over a primary-secondary (P-S) link, according to various embodiments.

FIG. 11 illustrates an embodiment of a transmission 1101 in which the secondary does not receive the audio information from the audio source. But in transmission 1101, the ACK from the primary is not jammed by the NACK from the secondary. In this instance, the secondary may send a missing packet request 1110 to the primary and the primary may respond with packet 1115. Missing packet request may be synchronous and correspond to a sniff as described in FIG. 7. Missing packet request may also be asynchronous.

Figure 12:
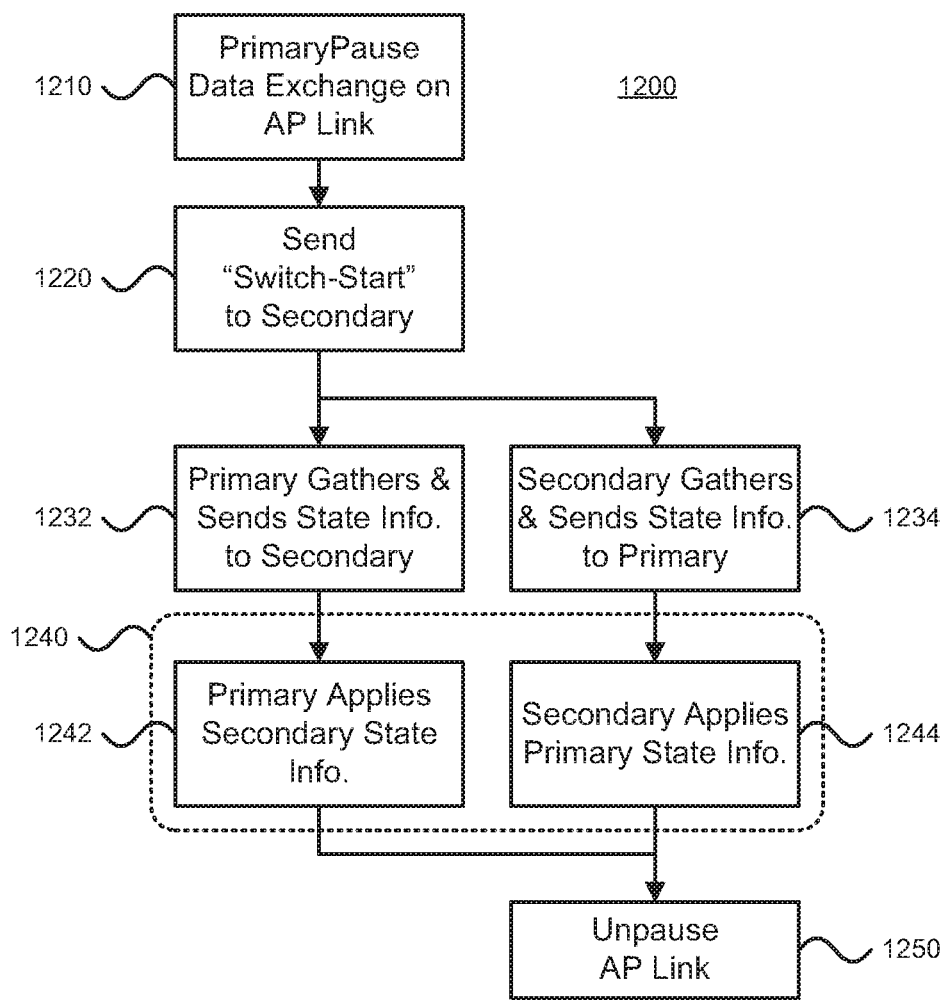
FIG. 12 is a flow diagram for role switch for a primary device and a secondary device, according to one embodiment.

FIG. 12 illustrates a method 1200 for switching the roles of the primary and secondary in operative communication with an audio source. First, the primary may pause the data exchange over the A-P link in step 1210. The primary may then send a "switch-start" message to the secondary in step 1220. In steps 1232 and 1234, the primary and secondary may each gather state information of the other. In steps 1242 and 1244 of step 1240, the primary may apply the state information of the secondary and the secondary may apply the state information of the primary. In this step, the former secondary may appear to the audio source as the primary and the former may no longer appear to the audio source. The new primary (former secondary) may then unpause the A-P link in step 1250 and continue data exchange over the A-P link.

Figure 13A:
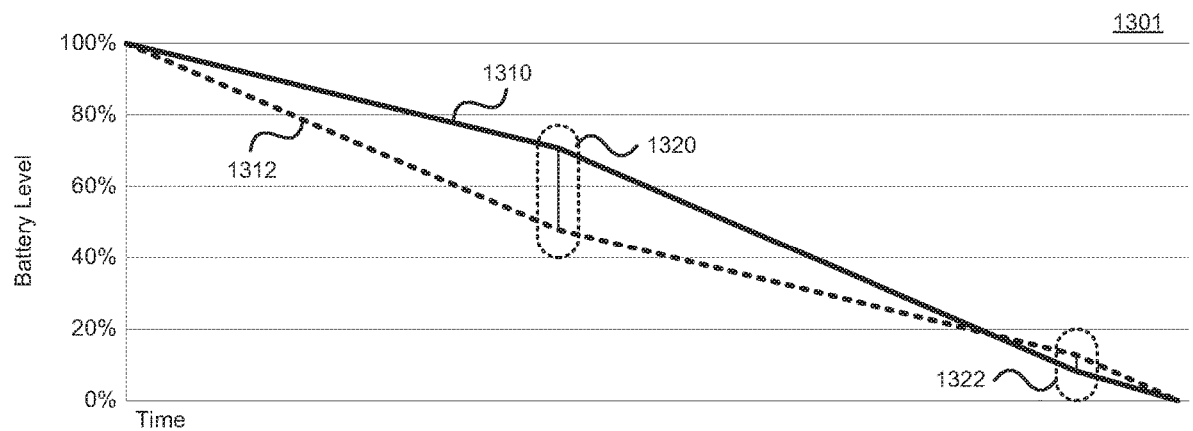
FIGS. 13A and 13B is are examples of role switch decision-making, according to various embodiments.
Figure 13B:
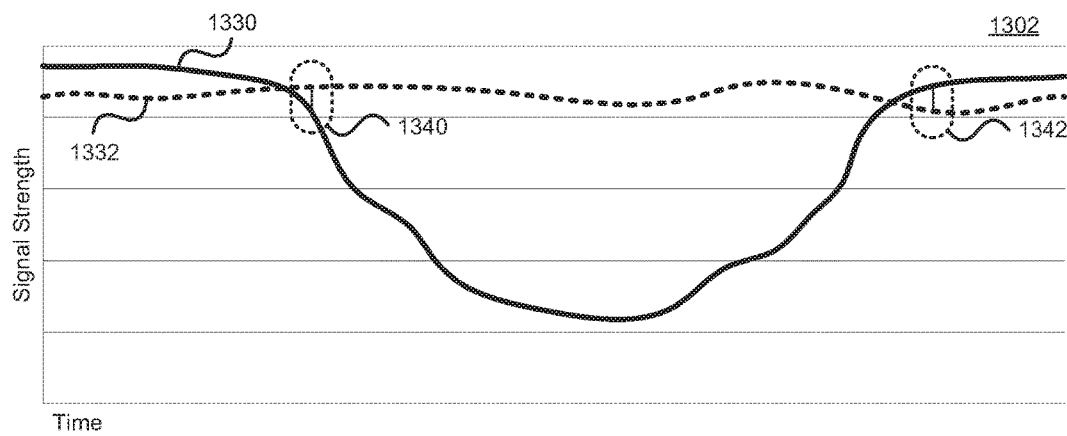

FIGS. 13A and 13B illustrate examples of primary/secondary role switches, according to various embodiments. The primary and secondary are not directly coupled to one another and may have different (or separate) batteries such that the remaining charge in one battery may not be the same, or substantially the same, as the remaining change in the other battery. In FIG. 13A a chart 1301 the remaining battery life of the primary and the secondary may be used to determine when/if to switch roles of the primary and the secondary. In some embodiments, more power may be consumed by the primary. As more power in consumed by the primary, the battery life of the primary is correspondingly lower. It may be preferable to switch the roll of the primary and the secondary to maintain the longest combined battery life of the combined wireless devices. Primary power level 1312 may drop faster than secondary power level 1310. At a certain time, the ratio of the primary and secondary power levels may be such that a role switch is determined. This decision may be based on relative power level. It may also be a fixed point (when the power level of the primary is less than 67% of capacity). In the embodiment shown in FIG. 13A, when the battery level of the primary is 2/3 that of the secondary, a role switch 1320 occurs. When this occurs, the secondary functions as the primary and vice versa. This means the secondary, now operating as the primary, will have its battery level drop faster than the primary (now the secondary). At a certain point, the battery level of the secondary will fall below that of the primary. And at another point, the battery level of the secondary (now the primary) may have a battery level that is 2/3 of the primary (now the secondary). When this occurs, a second role switch 1322 may happen, prolonging the operational life of the wireless audio system. One of ordinary skill in the art would understand that various battery voltage thresholds may be used. The 2/3 ratio is merely exemplary and is not intended to be limiting. In other embodiments, fixed voltages may be used. And in still other embodiments, hysteresis in the amount of battery may be used to prevent rapidly shifting roles between the primary and the secondary which may cause extraneous pauses of the A-P link and may result in decreased audio performance.

FIG. 13B illustrates a chart 1302 of signal strength of the wireless headsets over time and their corresponding roles as primary and secondary. It may be preferable to have the device with the lowest signal strength operate as the primary. This ensures that the eavesdropping by the secondary is using the strongest signal possible. Primary signal level 1332 may be lower because it is farther away from the audio source or because its environment is noisier or more attenuating of the wireless signal from the audio source. At a certain time, the secondary signal level 1340 may begin to fall. This could be because of an external signal that is interfering with the eavesdropping, because of some attenuating element near the secondary, or because the secondary may be moved away from the audio source while the position of the primary relative to the audio source remains constant. Still other causes for reduced signal strength may exist. When the signal strength on the secondary drops enough, perhaps with some hysteresis, a role switch according to FIG. 12 may occur. As the secondary signal strength 1330 (the secondary is actually operating as the primary) says below that of primary signal strength 1332, the roles remain switched. But at a certain point 1342 the roles may switch back again when the signal strength on the secondary (operating as the primary) rises and surpasses the primary signal strength (operating as the secondary).

Figure 14:
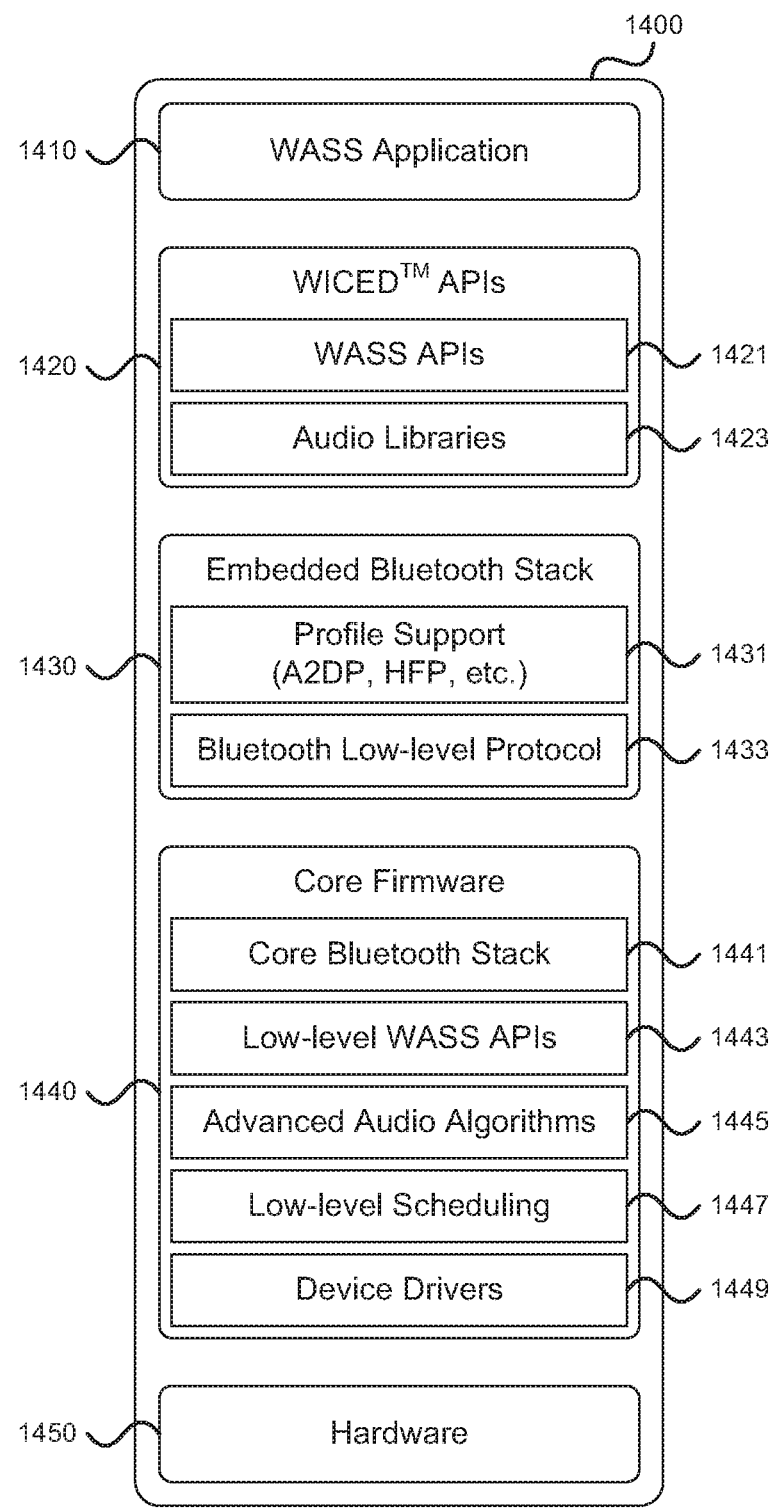
FIG. 14 is a software/firmware stack for wireless audio playback, according to one embodiment.

FIG. 14 illustrates a software/firmware stack 1400 for an audio device configured to perform the audio playback functions described herein. Stack 1400 may include a wireless audio stereo synchronization (WASS) application module 1410. Stack 1400 may also include a number of application programming interfaces (APIs), including wireless integrated connectivity for embedded devices (WICED™) APIs 1421 and audio libraries 1423. Stack 1400 may also include an embedded Bluetooth stack 1430, which may include a core a profile support module 1431 and a Bluetooth low-level protocol 1433. Profile support module 1433 may include information for support of profiles such as advanced audio distribution profile (A2DP) and hands-free profile (HFP). Stack 1400 may also include a core firmware module 1440, including a Bluetooth low-level protocol module 1441, low-level WASS APIs 1443, advanced audio algorithms 1445, low-level scheduling information 1447, and device drivers 1449. Stack 1400 may also include firmware and software for interacting and communicating with device specific hardware 1450.

FIG. 14 illustrates a single software/firmware stack. Stack 1400 may be disposed in each of the primary and the secondary device and the specific audio information that is played according to stack 1400 may be determined, in part, by the ID of the device (e.g., left or right). As both the primary and the secondary include the same software/firmware, they may be able to switch roles easily.

Various embodiments of the encryption/decryption techniques described herein may include various operations. These operations may be performed by hardware, firmware, or combination(s) thereof. As used herein, the term "coupled to" means connected directly, or connected indirectly through one or more intervening components over PCB tracks/pads, switches, buses, hubs, trace lines, and/or programmable interconnects, as the case may be. Any of the signals provided through various PCB tracks/pads, switches, hubs, traces, and programmable interconnects may be time multiplexed with other signals and provided over one or more common or dedicated buses and/or signal traces. Each of the buses may alternatively include one or more single signal traces, and one or more signal traces may alternatively perform the function of a bus.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A wireless stereo audio system comprising:
   a primary audio playback device in operative communication with an audio source over a medium; and
   a secondary audio playback device configured to eavesdrop audio information transmitted from the audio device to the primary audio playback device,
   wherein the secondary audio playback device is configured to transmit a negative acknowledgement (NACK) signal on the medium prior to an acknowledgement (ACK) signal from the primary audio playback device, the NACK for jamming the ACK signal from the primary audio playback device on the medium.

2. The wireless stereo audio system of claim 1, wherein the primary audio playback device is in operative communication with the secondary audio playback device.

3. The wireless stereo audio system of claim 2, wherein the primary audio device is configured to transmit communication information for the operative communication between the primary audio playback device and the audio source to the secondary audio playback device, the communication information for establishing an eavesdropping connection between the audio source and the secondary audio playback device.

4. The wireless stereo system of claim 1, wherein the primary audio playback device and the secondary audio playback device are configured as slaves to the audio source.

5. The wireless stereo system of claim 1, wherein the primary audio playback device is a master to the secondary audio playback device.

6. The wireless stereo audio system of claim 1, wherein the primary audio playback device is configured to send the secondary audio playback device audio information that is not received by the secondary audio playback device from the audio source.

7. The wireless stereo audio system of claim 6, wherein the audio information that is not received by the secondary audio playback device is identified by sharing packet sequence information between the primary audio playback device and the secondary audio playback device.

8. The wireless stereo audio system of claim 7, wherein the packet sequence information is shared during a sniff operation by the primary audio playback device and the secondary audio playback device.

9. The wireless stereo audio system of claim 6, wherein the audio information that is not received by the secondary audio playback device is recovered via a packet loss concealment scheme.

10. The wireless stereo audio system of claim 1, wherein the primary audio playback device and the secondary audio playback device are configured to swap roles based on a system parameter.

11. The wireless stereo audio system of claim 10, wherein the system parameter is remaining battery power.

12. The wireless stereo audio system of claim 10, wherein the system parameter is wireless signal strength between the audio source and the primary audio playback device and the secondary audio playback device.

13. The wireless stereo audio system of claim 1, wherein the primary device is a left earbud and the secondary device is a right earbud.

14. A method comprising:
   receiving, by a primary device, data on an audio source-primary device (A-P) link;
   pausing data exchange on the A-P link;
   gathering protocol and timing information for the A-P link;
   sending, by the primary device, the protocol and timing information for the A-P link to a secondary device;
   applying, by the secondary device, the protocol and timing information for the A-P link to the secondary device;
   resuming data exchange on the A-P link;
   establishing an audio source-secondary device (A-S) link, wherein the A-S link is an eavesdropping link, the eavesdropping link unknown to an audio source;
   receiving information for the secondary device over the A-S link, the received information simultaneously communicated over the A-P link
   transmitting an acknowledgement (ACK) signal by the primary device upon successful receipt of audio information over the A-P link; and
   transmitting a negative acknowledgement (NACK) signal by the secondary device upon unsuccessful receipt of audio information over the A-S link, the NACK signal configured to jam the ACK signal by the primary device, wherein the NACK signal is transmitted before the ACK signal.

15. A first wireless audio playback device comprising:
   An audio transducer for playing audio information;
   an antenna configured to receive audio information over a medium from an audio source; and
   a controller configured to execute instructions, wherein the controller is configured to send a negative acknowledgement (NACK) signal on the medium upon failed receipt of audio information from the audio source, the NACK signal for disrupting an acknowledgement (ACK) signal from a second wireless audio playback device and transmitted on the medium prior to the ACK signal from the second wireless audio playback device.

16. The first wireless audio playback device of claim 15, wherein audio information received over the medium from the audio source is received via an eavesdropping link.

17. The first wireless audio playback device of claim 15, wherein the eavesdropping link is transparent to the audio source.

* * * * *